United States Patent
Yang (10) Patent No.: US 9,280,509 B2
(45) Date of Patent: Mar. 8, 2016

(54) DATA INTERFACE SLEEP MODE LOGIC

(75) Inventor: Wei-Lien Yang, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 644 days.

(21) Appl. No.: 13/537,602

(22) Filed: Jun. 29, 2012

(65) Prior Publication Data

US 2014/0006840 A1 Jan. 2, 2014

(51) Int. Cl.
| | |
|---|---|
| G06F 1/04 | (2006.01) |
| G06F 1/14 | (2006.01) |
| G06F 13/42 | (2006.01) |
| G06F 9/48 | (2006.01) |
| G06F 1/32 | (2006.01) |

(52) U.S. Cl.
CPC .............. *G06F 13/426* (2013.01); *G06F 1/04* (2013.01); *G06F 1/14* (2013.01); *G06F 9/4825* (2013.01); *G06F 1/324* (2013.01); *G06F 1/325* (2013.01)

(58) Field of Classification Search
CPC ........... G06F 1/14; G06F 9/4825; G06F 1/04; G06F 1/324
See application file for complete search history.

(56) References Cited

U.S. PATENT DOCUMENTS

| | | | | |
|---|---|---|---|---|
| 6,125,450 | A  * | 9/2000 | Kardach | 713/323 |
| 6,593,845 | B1 * | 7/2003 | Friedman et al. | 340/10.33 |
| 8,448,003 | B1 * | 5/2013 | Rosen | 713/323 |
| 2004/0119506 | A1 * | 6/2004 | Ioi | 327/2 |
| 2007/0150214 | A1 * | 6/2007 | Qin et al. | 702/60 |
| 2009/0164821 | A1 * | 6/2009 | Drescher | 713/323 |
| 2009/0315591 | A1 | 12/2009 | Pyeon et al. | |
| 2010/0171539 | A1 | 7/2010 | Chang et al. | |
| 2010/0295582 | A1 | 11/2010 | Gaulin et al. | |

FOREIGN PATENT DOCUMENTS

| | | | | |
|---|---|---|---|---|
| EP | WO2012049309 | A1 * | 10/2011 | 714/32 |
| WO | 2012049309 | | 4/2012 | |

OTHER PUBLICATIONS

International Searching Authority, "Notification of Transmittal of the International Search Report and the Written Opinion of the International Searching Authority," mailed Oct. 21, 2013, in International application No. PCT/US2013/048076.

* cited by examiner

*Primary Examiner* — Mohammed Rehman
*Assistant Examiner* — Gayathri Sampath
(74) *Attorney, Agent, or Firm* — Trop, Pruner & Hu, P.C.

(57) ABSTRACT

In one embodiment, an apparatus may include a rising edge detector to detect a rising edge in a signal. The apparatus may also include a counter to perform a count to a first value based on an input clock signal. The apparatus may also include an output unit to generate a sleep signal after the first value is reached if the rising edge detector does not detect the rising edge in the signal.

20 Claims, 8 Drawing Sheets

DATA INTERFACE SLEEP MODE LOGIC

BACKGROUND

Embodiments relate generally to data interfaces for electronic devices.

Many electronic devices include multiple components coupled together by one or more data interfaces. For example, a cellular telephone may include a processor core coupled to a radio transceiver, a sound input device, a sound output device, a camera, a display device, a memory device, etc. The functionality of such components has been continually improved to meet market demands. Accordingly, the data interfaces between the components may need to be adapted to such functionality.

DETAILED DESCRIPTION

Some electronic devices include links to transmit data between components. In the event that no data is being transmitted during a period of time, some receiving components may enter a sleep mode (i.e., a reduced power state). In accordance with some embodiments, an apparatus may enable a sleep mode based on detecting a falling edge of a data signal. Further, in some embodiments, the apparatus may exit the sleep mode based on detecting a rising edge of the data signal. In one or more embodiments, the apparatus may reduce unnecessary cycling of the sleep mode.

Figure 1:
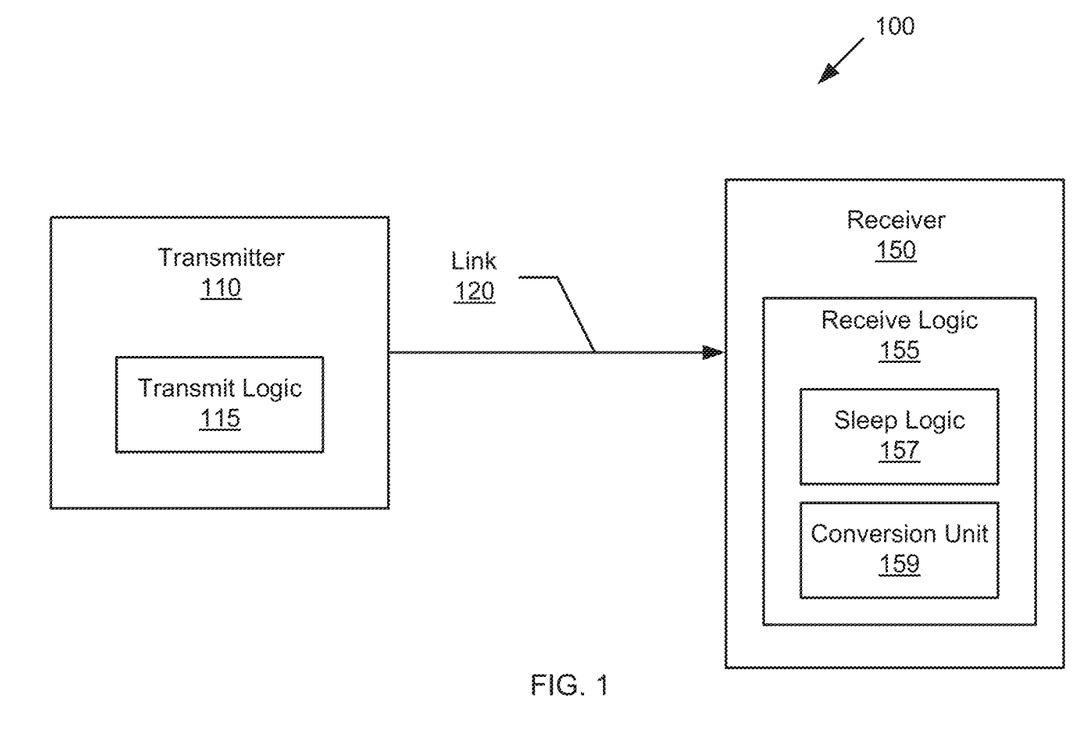
FIG. 1 is a block diagram of a system in accordance with one or more embodiments.

Referring to FIG. 1, shown is a block diagram of an apparatus 100 in accordance with one or more embodiments. As shown in FIG. 1, the apparatus 100 may include a link 120 connecting a transmitter 110 and a receiver 150. In accordance with some embodiments, the apparatus 100 may be any electronic device, such as a cellular telephone, a computer, a media player, a network device, etc.

In some embodiments, the transmitter 110 and the receiver 150 may exist to connect any components or peripherals of the apparatus 100, such as a processor, a processor core, a memory device, a display device, a sound device, a wireless transceiver, a camera, etc. Note that, while only one pair of transmitter 110 and receiver 150 is shown for the sake of clarity, the example shown in FIG. 1 is not intended to be limiting. Accordingly, it should be appreciated that any number of such transmitter-receiver pairs may exist to connect various components of the apparatus 100.

In accordance with some embodiments, the link 120 may be any electrical or data connection(s) (e.g., motherboard connection, input/output cable, network connector, bus, wireless link, etc.). In one or more embodiments, the transmitter 110 may include transmit logic 115 to manage data connections to the receiver 150. Further, in some embodiments, the receiver 150 may include receive logic 155 to manage the data connections from the transmitter 110.

In accordance with some embodiments, the link 120, the transmit logic 115, and the receive logic 155 may use one or more data interface protocols. For example, in some embodiments, the link 120, the transmitter 110, and the receiver 150 may use the M-PHY specification of the Mobile Industry Processor Interface (MIPI) Alliance (MIPI Specification for M-PHY Version 1.00.00 of Feb. 8, 2011, approved Apr. 28, 2011). In such embodiments, the link 120 may include serial lines carrying differential pulse width modulated (PWM) signals. Optionally, such differential signals may be referred to as "self-clocking" if clock information is included in the period of the differential signal waveform.

In one or more embodiments, the differential PWM signals of the link 120 may operate under one or more data rate ranges of the M-PHY specification (referred to as "GEARs"). For example, the link 120 may operate under GEAR 1 (3 Mbps to 9 Mbps), GEAR 2 (6 Mbps to 18 Mbps), GEAR 3 (12 Mbps to 36 Mbps), GEAR 4 (24 Mbps to 72 Mbps), GEAR 5 (48 Mbps to 144 Mbps), GEAR 6 (96 Mbps to 288 Mbps), GEAR 7 (192 Mbps to 576 Mbps), etc.

In accordance with some embodiments, the receive logic 155 may include a conversion unit 159. In some embodiments, the conversion unit 159 may include functionality to convert differential signals into a single-ended signal. Further, the conversion unit 159 may also include functionality to generate an input clock signal based on self-clocking information of the differential signals. This functionality of the conversion unit 159 is described further below with reference to FIG. 2.

In accordance with some embodiments, the receive logic 155 may include functionality to enable the receiver 150 to operate in a sleep mode. In some embodiments, a sleep mode may be an operating mode in which various components of the receiver 150 may be powered down and/or placed in a reduced power state. Further, in one or more embodiments, the sleep mode may be entered during periods in which little or no input signals are received from the transmitter 110, thus reducing the electrical power required by the receiver 150.

In addition, in some embodiments, the receive logic 155 may include functionality to enable the receiver 150 to operate in a prepared mode. In some embodiments, a prepared mode may be an operating mode in which components of the receiver 150 are prepared (e.g., powered up, initialized, etc.) to receive a signal from the transmitter 110.

As shown, in some embodiments, the receive logic 155 may include a sleep logic 157. In accordance with some embodiments, the sleep logic 157 may include functionality to detect falling and rising edges of a signal received through the link 120. Further, the sleep logic 157 may also include functionality to begin a wait period based on detecting a falling edge of the received signal. In some embodiments, the wait period may be based on a clock signal derived from the received signal. In addition, the sleep logic 157 may also include functionality to generate a sleep signal (i.e., an indication that the receiver 150 is to enter a sleep mode) based on completing the wait period without detecting a rising edge of the received signal. In some embodiments, the sleep logic 157 may function to prevent the receiver 150 from entering a sleep mode prematurely, and may thus reduce unnecessary cycling in and out of sleep mode. This functionality of the sleep logic 157 is described further below with reference to FIGS. 2-5. In some embodiments, the sleep logic 157 may remain in a powered state when the receiver 150 is in a sleep mode.

In one or more embodiments, the transmit logic 115 and/or the receive logic 155 may be implemented in hardware, software, and/or firmware. In firmware and software embodiments, they may be implemented by computer executed instructions stored in a non-transitory computer readable medium, such as an optical, semiconductor, or magnetic storage device. While shown with this particular implementation in the embodiment of FIG. 1, the scope of the various embodiments discussed herein is not limited in this regard.

Figure 2:
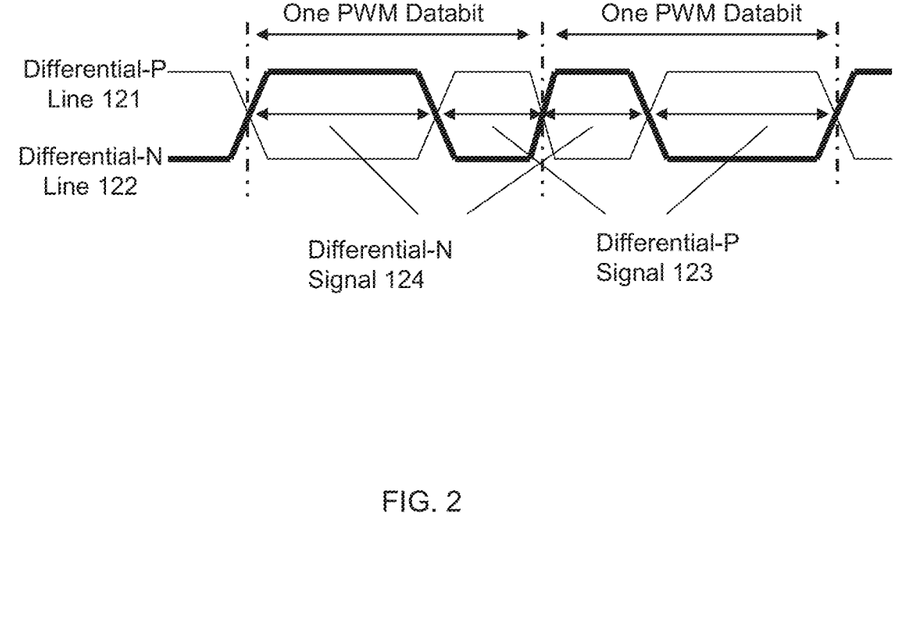
FIG. 2 is an example timing diagram in accordance with one or more embodiments.

Referring to FIG. 2, shown is a timing chart of a system in accordance with one or more embodiments. The timing chart shows an example of power states (i.e., voltage levels) of differential-p line 121 and differential-n line 122 with respect to time. In some embodiments, the differential lines 121 and 122 may transport differential PWM signals, and may together correspond generally to the link 120 shown in FIG. 1.

In one or more embodiments, the conversion unit 159 (shown in FIG. 1) may sample the differential lines 121 and 122 for a designated time period to determine how the transferred data (e.g., a single PWM data bit) may be expressed. For example, as shown, the transferred data bit may constitute a differential-p signal 123 when the differential-p line 121 is in a high power state and the differential-n line 122 is in a low power state during the sampled time period. Otherwise, the transferred data bit may constitute a differential-n signal 124 when the differential-n line 122 is in a high power state and the differential-p line 121 is in a lower power state during the sampled time period. In this manner, the receive logic 155 may convert the differential signals 123, 124 into a PWM single-ended signal. Further, in some embodiments, the conversion unit 159 may include functionality to analyze self-clocking properties of the waveforms of the differential signals 123, 124 (e.g., an edge detector) to obtain the clock signal for the single-ended signal.

Figure 3:
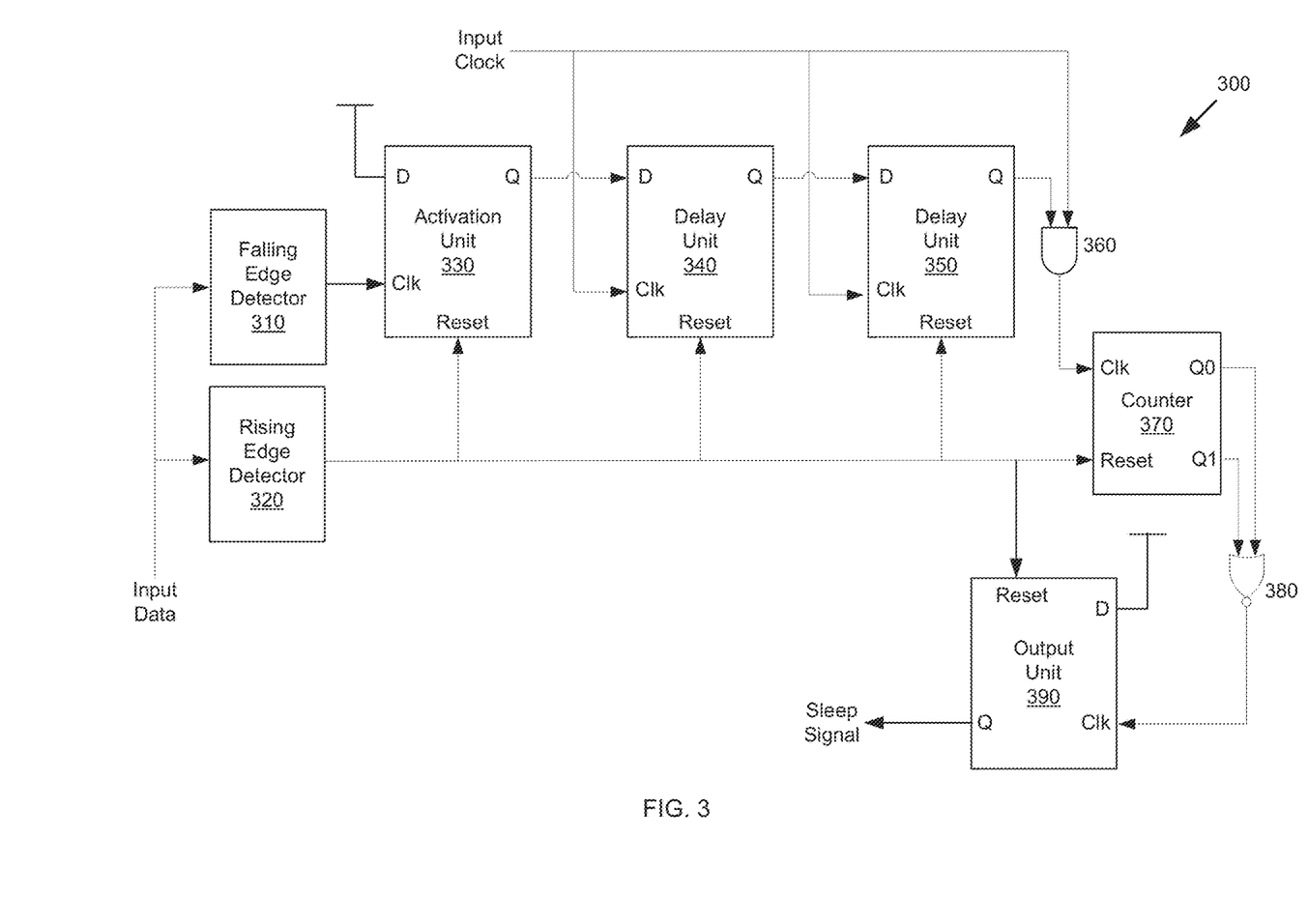
FIG. 3 is a block diagram of a system in accordance with one or more embodiments.

Referring to FIG. 3, shown is a block diagram of a sleep logic 300 in accordance with one or more embodiments. More specifically, the sleep logic 300 may generally correspond to the sleep logic 157 shown in FIG. 1. As shown, the sleep logic 300 may receive an input data signal and an input clock signal. In one or more embodiments, the input data signal may correspond to the PWM single ended signal discussed with reference to FIG. 2. Further, in some embodiments, the input clock signal may correspond to the clock signal for the single-ended signal discussed with reference to FIG. 2.

As shown in FIG. 3, in one or more embodiments, the input data signal may be provided to a falling edge detector 310 and a rising edge detector 320. In some embodiments, the falling edge detector 310 may include functionality to detect a falling edge (e.g., the end of a pulse) of the input data signal, and to generate a pulse in response to detecting the falling edge. Further, the rising edge detector 320 may include functionality to detect a rising edge (e.g., the beginning of a pulse) of the input data signal, and to generate a pulse in response to detecting the rising edge.

As shown, the output of the falling edge detector 310 may be provided to a clock input of an activation unit 330. Further, the output of the rising edge detector 320 may be provided to reset inputs of activation unit 330, a first delay unit 340, a second delay unit 350, a counter 370, and output unit 390. In one or more embodiments, the activation unit 330, the first delay unit 340, the second delay unit 350, and/or the output unit 390 may each be a flip flop.

In some embodiments, the data input to the activation unit 330 may be a constant logical high signal (e.g., "1"). The output signal of the activation unit 330 may be coupled to a data input of the first delay unit 340. The input clock signal may be provided to the clock input of the first delay unit 340. The output signal of the first delay unit 340 may be provided to the data input of the second delay unit 350.

The input clock signal may also be provided to the clock input of the second delay unit 350. The output signal of the second delay unit 350 may be provided, along with the input clock signal, to AND gate 360. Further, the output signal of AND gate 360 may be provided to the clock input of the counter 370.

In some embodiments, the counter 370 may be a two bit down counter. Thus, in such embodiments, the counter 370 may provide a first bit signal at output Q0 and a second bit signal at output Q1, which together may correspond to a two bit binary number. Further, in such embodiments, the outputs Q0, Q1 may provide, in response to each pulse received at the clock input, a count from three to zero (i.e., 11, 10, 01, and 00, in binary form).

As shown, the outputs Q0, Q1 of the counter 370 may both be provided to NOR gate 380. Further, the output of NOR gate 380 may be provided to a clock input of an output unit 390. The data input to output unit 390 may be a constant logical high signal. In some embodiments, the output of output unit 390 may be a sleep signal to indicate that a receiver (e.g., receiver 150 shown in FIG. 1) is to enter a sleep mode.

In one or more embodiments, a falling edge in the input signal may activate the activation unit 330, and may cascade through the first delay unit 340 and the second delay unit 350 during subsequent clock cycles. Thus, in some embodiments, these components may function to delay the start of the count performed by counter 370 in response to the falling edge. In addition, in one or more embodiments, a rising edge in the input signal may reset each of the activation unit 330, the first delay unit 340, the second delay unit 350, and/or the counter 370. Accordingly, the rising edge may reset the entire delay period prior to beginning the count, or may reset the count performed by counter 370 before it is completed.

In one or more embodiments, the sleep logic 300 shown in FIG. 3 may provide a delay period equivalent to several cycles of the input data signal (e.g., 4-6 cycles) after a falling edge of the input data signal. Accordingly, in some embodiments, the sleep logic 300 may function to prevent a receiver from entering a sleep mode prematurely (e.g., during a short period of zero-level signal), and may thus reduce unnecessary cycling in and out of sleep mode. In some embodiments, the sleep logic 300 may remain in a powered state when the receiver is in a sleep mode.

Note that the examples shown in FIGS. 1-3 are provided for the sake of illustration, and are not intended to limit any embodiments. For example, embodiments may include any number and/or arrangement of transmitters 110 and/or receivers 150. In another example, the counter 370 may be an up counter, and/or may count any number of bits. In yet another example, the sleep logic 300 may include additional and/or different components to provide any delay period after a falling edge of the input data signal. It is contemplated that some embodiments may include any number of components in addition to those shown, and that different arrangement of the components shown may occur in certain implementations. Further, it is contemplated that specifics in the examples shown in FIGS. 1-3 may be used anywhere in one or more embodiments.

Figure 4:
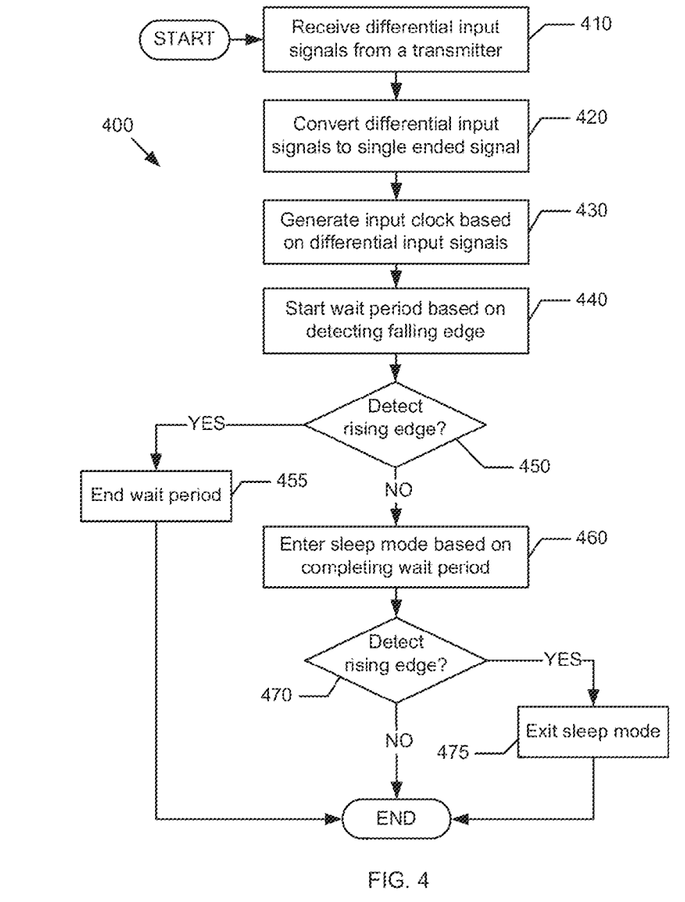
FIG. 4 is a flow chart of a method in accordance with one or more embodiments.

FIG. 4 shows a sequence 400 for managing a sleep mode in accordance with one or more embodiments. In one embodiment, the sequence 400 may be part of the receive logic 155 shown in FIG. 1. In other embodiments, the sequence 400 may be implemented by any other part of receiver 150. The sequence 400 may be implemented in hardware, software, and/or firmware. In firmware and software embodiments it may be implemented by computer executed instructions stored in a non-transitory computer readable medium, such as an optical, semiconductor, or magnetic storage device.

At step 410, differential input signals may be received from a transmitter. For example, referring to FIGS. 1 and 2, the receive logic 155 may receive two differential signals 123, 124. In some embodiments, the differential signals may be received from a transmitter (e.g., transmitter 110 shown in FIG. 1). In one or more embodiments, the received differential signals may be PWM signals under the M-PHY specification.

At step 420, the differential input signals (received at step 410) may be converted to a single-ended signal. For example, referring to FIGS. 1 and 2, the conversion unit 159 may convert the differential signals 123, 124 into the single-ended signal 235.

At step 430, an input clock signal may be generated based on the differential input signals. For example, referring to FIGS. 1 and 2, the conversion unit 159 may analyze the waveforms of the differential signals 123, 124 to determine an input clock rate. In some embodiments, the conversion unit 159 may include an edge detector to determine the input clock rate.

At step 440, a wait period may be started based on detecting a falling edge in the single-ended signal. For example, referring to FIG. 3, the falling edge detector 310 may detect a falling edge in the single-ended signal. In response, the sleep logic 300 may begin a wait period. In some embodiments, the wait period may be based on cycles of the input clock signal (determined at step 430). For example, in some embodiments, the sleep logic 300 may begin a wait period of 4-6 pulses of the input clock signal.

At step 450, a determination may be made about whether a rising edge is detected in the single-ended signal during the wait period. For example, referring to FIGS. 1-3, the rising edge detector 320 may detect a rising edge in the single-ended signal during the wait period.

If it is determined at step 450 that a rising edge is detected in the single-ended signal during the wait period, then at step 455, the wait period may be ended, and the sequence 400 ends. For example, referring to FIG. 3, the sleep logic 300 may end the wait period in response to a pulse from the rising edge detector 320.

However, if it is determined at step 450 that a rising edge is not detected during the wait period, then at step 460, a sleep mode may be entered in response to completing the wait period. For example, referring to FIG. 1-3, in response to completing the wait period, the sleep logic 300 may send a sleep signal (i.e., a signal indicating that a receiver is to enter a sleep mode). In response to the sleep signal, the receiver 150 may enter a sleep mode (e.g., an operating mode requiring reduced power). In one or more embodiments, the sleep logic 300 remains powered even when the receiver 150 is in the sleep mode.

At step 470, a determination may be made about whether a rising edge is detected in the single-ended signal during the sleep mode. For example, referring to FIGS. 1-3, the rising edge detector 320 may detect a rising edge in the single-ended signal during the sleep mode.

If it is determined at step 470 that a rising edge is not detected in the single-ended signal during the sleep mode, then the sleep mode is maintained, and the sequence 400 ends. However, if it is determined at step 470 that a rising edge is detected during the sleep mode, then at step 475, the sleep mode may be exited. For example, referring to FIGS. 1 and 3, the receiver 150 may exit the sleep mode in response to a pulse from the rising edge detector 320. In one or more embodiments, after exiting the sleep mode, the receiver 150 may enter a prepared mode to receive a data signal. After step 475, the sequence 400 ends.

Figure 5:
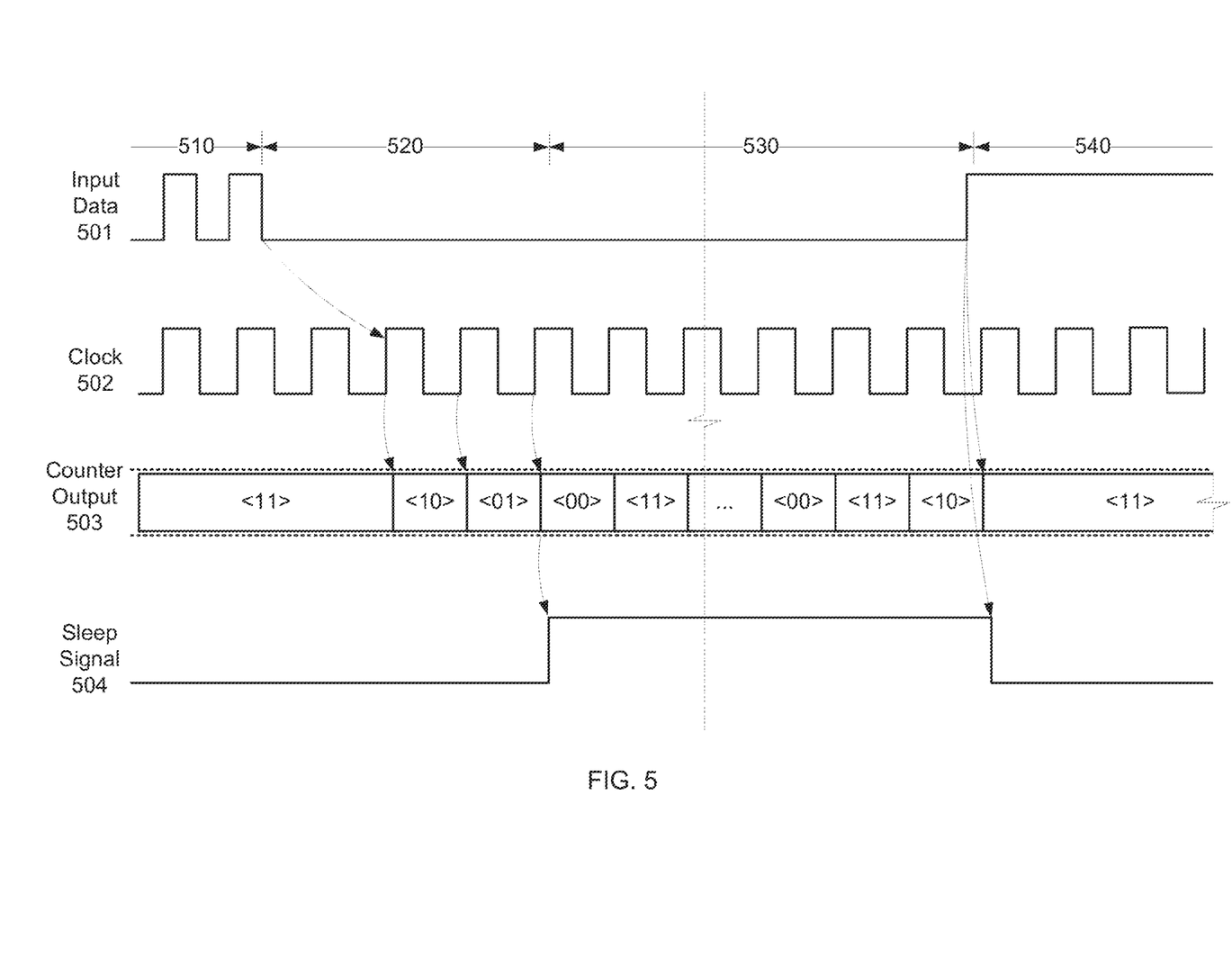
FIG. 5 is an example timing diagram in accordance with one or more embodiments.

Referring now to FIG. 5, shown is a timing diagram of a system in accordance with one or more embodiments. Specifically, the timing diagram may correspond to various signals involved in the systems and processes discussed above with reference to FIGS. 1-4. In this example, the timing diagram is divided into time periods: a receiving period 510, a waiting period 520, a sleep period 530, and a prepared period 540.

The first signal shown in FIG. 5 is a single-ended input data signal 501. As discussed above, the single-ended signal 501 may be generated based on differential signals (e.g., differential signals 123, 124 shown in FIG. 2).

The second signal shown in FIG. 5 is a clock signal 502. As discussed above, the clock signal 502 may be generated based on self-clocking properties of the differential signals (e.g., differential signals 123, 124 shown in FIG. 2). Thus, the pulses of the clock signal 502 may correspond to the clock periods determined from the differential signals.

The third signal shown in FIG. 5 is a counter output 503. In some embodiments, the counter output 503 may correspond to a combination of outputs Q0, Q1 of the counter 370 shown in FIG. 3.

The fourth signal shown in FIG. 5 is a sleep signal 504. In some embodiments, the sleep signal 504 may indicate that a receiver (e.g., receiver 150 shown in FIG. 1) may enter a sleep mode (e.g., a reduced power operating mode).

In the receiving period 510, the single-ended signal 501 includes pulses indicating high logical values (e.g., "1"). Further, in the receiving period 510, the sleep signal 504 is a low logical value (e.g., "0"). In this example, the falling edge of the last pulse of the single-ended signal 501 in the receiving section 510 corresponds to the beginning of the waiting period 520. Note that, in the waiting period 520, the single-ended signal 501 does not include any pulses, and thus corresponds to a continuous low logical value (e.g., "0"). In one or more embodiments, the waiting period 520 may correspond generally to the delay period provided by the sleep logic 300 shown in FIG. 3.

In this example, after two pulses of the clock signal 502 in the waiting period 520, the counter output 503 begins to count down, with each clock pulse, from the binary value "11" (i.e., three) to the binary value "00" (i.e., zero). Upon reaching the binary value "00," the sleep signal 504 switches to a high logical value (e.g., "1"). Note that, in this example, this event corresponds to the transition from the waiting period 520 to the sleep period 530. In one or more embodiments, the high logical value of the sleep signal 504 indicates that the receiver (e.g., receiver 150 shown in FIG. 1) is to enter a sleep mode.

As shown, the sleep period 530 continues until an extended pulse is received in the single-ended signal 501. In one or more embodiments, such an extended pulse may indicate an incoming transmission. In response to the extended pulse, the counter output 503 is reset to the binary value "11." Further, the sleep signal 504 switches to a low logical value, thus indicating that the receiver is to exit the sleep mode. In this example, this event corresponds to the transition from the sleep period 530 to the prepared period 540. In some embodiments, the receiver may respond to the extended pulse by entering a prepared mode.

Figure 6:
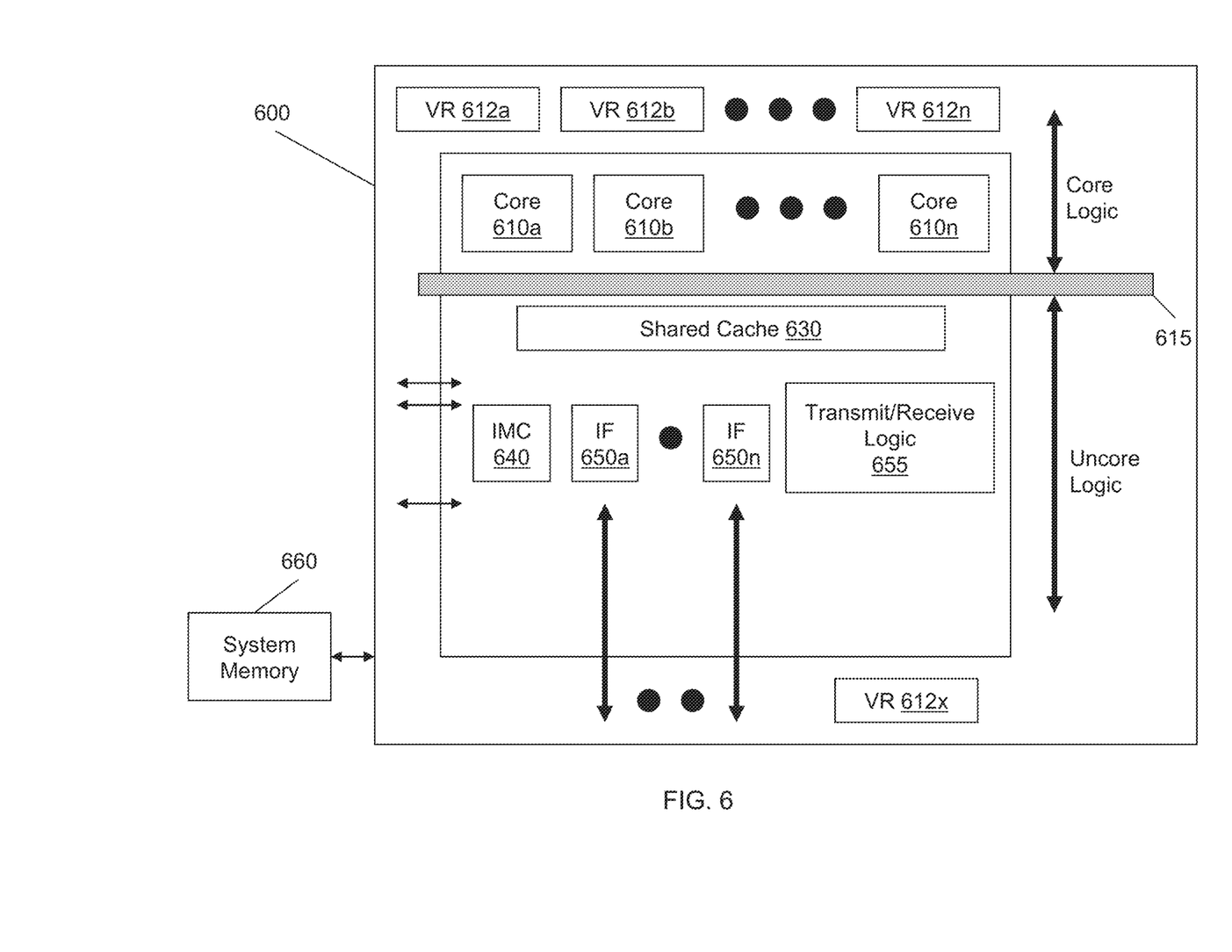
FIG. 6 is a block diagram of a processor in accordance with one or more embodiments.

Referring now to FIG. 6, shown is a block diagram of a processor in accordance with one or more embodiments. As shown in FIG. 6, processor 600 may be a multicore processor including a plurality of cores 610a-610n. Each core may be associated with a corresponding voltage regulator 612a-612n. The various cores may be coupled via an interconnect 615 to an uncore logic that includes various components. As seen, the uncore logic may include a shared cache 630 which may be a last level cache. In addition, the uncore logic may include an integrated memory controller 640, various interfaces 650 and transmit/receive logic 655.

In one or more embodiments, transmit/receive logic 655 may include all or a portion of the sleep logic 300 described above with reference to FIG. 3. Thus, the transmit/receive logic 655 may enable the cores 610a-610n and/or other components (e.g., components included in a mobile computing device) to enter a sleep mode in accordance with some embodiments.

With further reference to FIG. 6, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 6, the scope of the various embodiments discussed herein is not limited in this regard.

Figure 7:
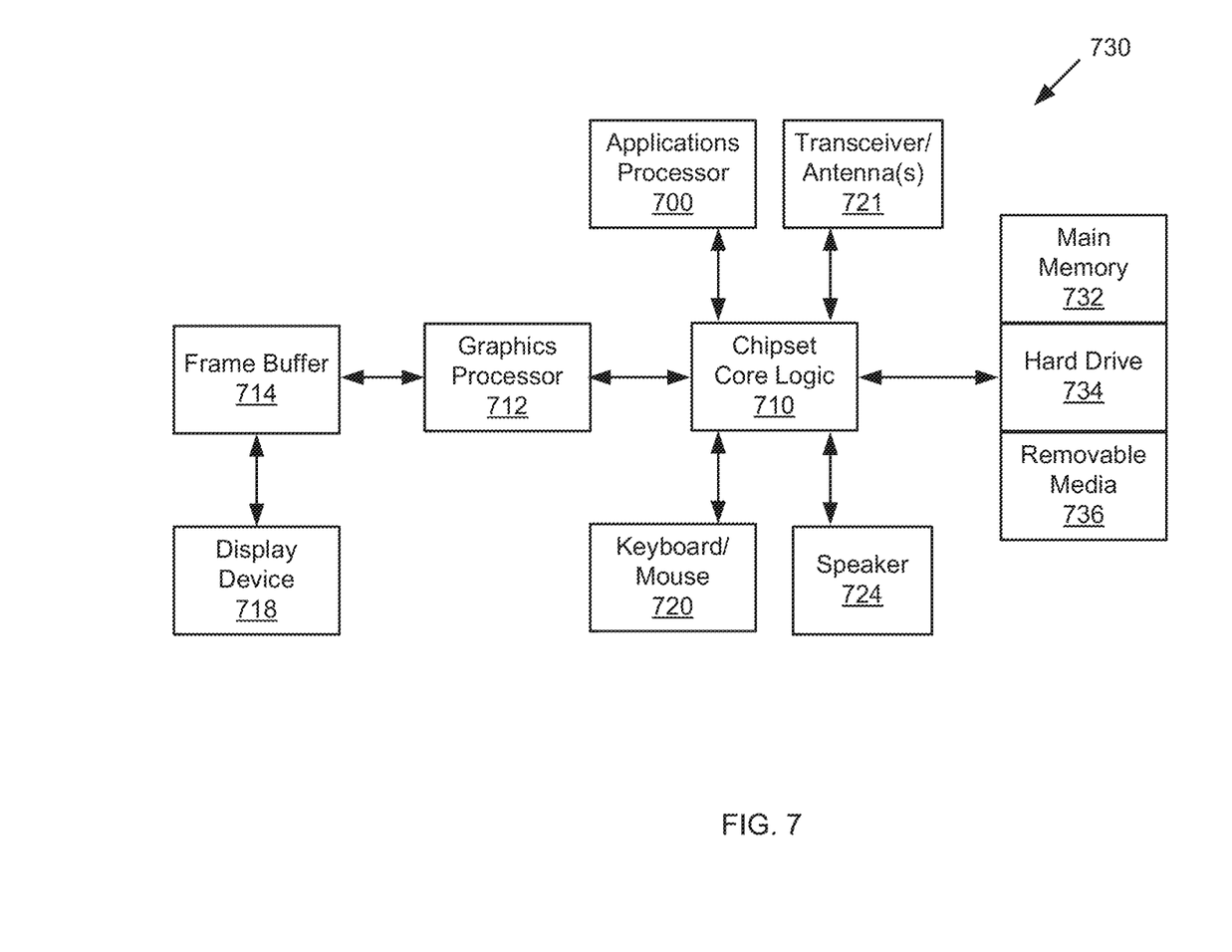
FIG. 7 is a block diagram of an example system in accordance with one or more embodiments.

Embodiments may be used in many different environments. Referring now to FIG. 7, shown is a block diagram of a computer system 730 with which embodiments can be used. The computer system 730 may include a hard drive 734 and a removable storage medium 736, coupled by a bus (shown as an arrow) to a chipset core logic 710. A keyboard and/or mouse 720, or other conventional components, may be coupled to the chipset core logic.

The core logic may couple to the graphics processor 712, and the applications processor 700 in one embodiment. The graphics processor 712 may also be coupled to a frame buffer 714. The frame buffer 714 may be coupled to a display device 718, such as a liquid crystal display (LCD) touch screen. In one embodiment, the graphics processor 712 may be a multi-threaded, multi-core parallel processor using single instruction multiple data (SIMD) architecture.

The chipset logic 710 may include a non-volatile memory port to couple to the main memory 732. Also coupled to the core logic 710 may be a radio transceiver and antenna(s) 721. Speakers 724 may also be coupled to core logic 710.

Figure 8:
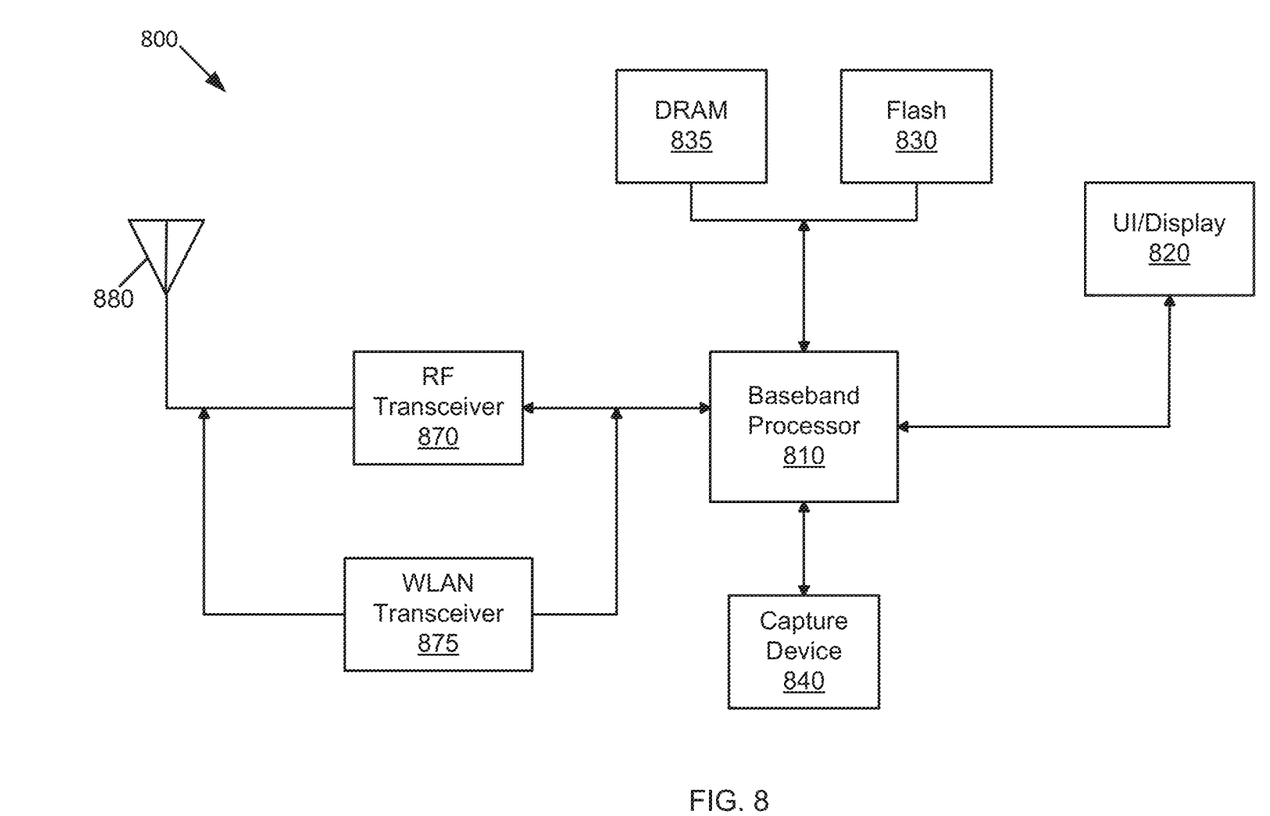
FIG. 8 is a block diagram of an example system in accordance with one or more embodiments.

Referring now to FIG. 8, shown is a block diagram of an example system 800 with which embodiments can be used. As seen, system 800 may be a smartphone or other wireless communicator. As shown in the block diagram of FIG. 8, system 800 may include a baseband processor 810 which may be a multicore processor that can handle both baseband processing tasks as well as application processing. Thus baseband processor 810 can perform various signal processing with regard to communications, as well as perform computing operations for the device. In turn, baseband processor 810 can couple to a user interface/display 820 which can be realized, in some embodiments by a touch screen display. In addition, baseband processor 810 may couple to a memory system including, in the embodiment of FIG. 8 a non-volatile memory, namely a flash memory 830 and a system memory, namely a dynamic random access memory (DRAM) 835. As further seen, baseband processor 810 can further couple to a capture device 840 such as an image capture device that can record video and/or still images.

To enable communications to be transmitted and received, various circuitry may be coupled between baseband processor 810 and an antenna 880. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 875, local wireless signals, such as according to a Bluetooth™ standard or an IEEE 802.11 standard such as IEEE 802.11a/b/g/n can also be realized. Although shown at this high level in the embodiment of FIG. 8, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be an apparatus including: a rising edge detector to detect a rising edge in a signal; a counter to perform a count to a first value based on an input clock signal; and an output unit to generate a sleep signal after the first value is reached if the rising edge detector does not detect the rising edge in the signal. The apparatus may also include a falling edge detector to detect a falling edge in the signal. The counter may be to begin the count in response to the falling edge detector detecting the falling edge in the signal. The output unit may be to terminate the sleep signal in response to the rising edge detector detecting the rising edge in the signal. The apparatus may also include an activation unit coupled to an output of the falling edge detector. The apparatus may also include a first delay unit coupled to an output of the activation unit. The apparatus may also include a second delay unit coupled to an output of the first delay unit. The output of the rising edge detector may be coupled to reset inputs of the activation unit, the first delay unit, the second delay unit, the counter, and the output unit. Each of the activation unit, the first delay unit, the second delay unit, and the output unit may be a flip flop. The counter may be a two bit down counter. The sleep signal may be to indicate that a receiver is to enter a sleep mode. The apparatus may also include a conversion unit to generate the signal based on at least two differential input signals, wherein the signal is a single-ended signal. The conversion unit may also be to generate the input clock signal based on the at least two differential input signals. The at least two differential input signals may be Pulse Width Modulated (PWM) signals. The PWM signals may conform to the Mobile Industry Processor Interface (MIPI) M-PHY Specification.

Another example embodiment may be a system including: a system on a chip comprising at least one core having at least one execution unit and receiver logic, the receiver logic including a falling edge detector to detect a falling edge in a signal; a rising edge detector to detect a rising edge in the signal; a counter to perform a count to a first value in response to the falling edge detector detecting the falling edge in the signal; and an output unit to generate a sleep signal after the count when the rising edge detector does not detect the rising edge in the signal. The system may also include a wireless device coupled to the system on the chip via an interconnect, the interconnect used to communicate data between the wireless device and the receiver logic of the system on the chip. The counter may perform the count based on an input clock signal. The receiver logic may also include at least one delay unit to delay a start of the count after the falling edge detector detects the falling edge. The output unit may be to terminate the sleep signal in response to the rising edge detector detecting the rising edge in the signal.

Yet another example embodiment may be a method including: detecting, in a receiver logic of a first device, a falling edge in a signal; in response to detecting the falling edge, initiating a delay period based on an input clock signal; and in response to completing the delay period, generating a sleep signal until detecting a rising edge in the signal. The method may also include entering a sleep mode in response to the sleep signal. The method may also include entering a prepared mode in response to detecting the rising edge in the signal.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. An apparatus comprising:
 a rising edge detector to detect a rising edge in a signal;
 a falling edge detector to detect a falling edge in the signal;
 a counter to begin a count to a first value in response to the falling edge detector detecting the falling edge in the signal;
 at least one delay unit to delay a start of the count after the falling edge detector detects the falling edge; and
 an output unit to generate a sleep signal after the first value is reached when the rising edge detector does not detect the rising edge in the signal.

2. The apparatus of claim 1, wherein the output unit is to terminate the sleep signal in response to the rising edge detector detecting the rising edge in the signal.

3. The apparatus of claim 1, further comprising an activation unit coupled to an output of the falling edge detector.

4. The apparatus of claim 3, the at least one delay unit comprising a first delay unit coupled to an output of the activation unit.

5. The apparatus of claim 4, the at least one delay unit further comprising a second delay unit coupled to an output of the first delay unit.

6. The apparatus of claim 5, wherein an output of the rising edge detector is coupled to reset inputs of the activation unit, the first delay unit, the second delay unit, the counter, and the output unit.

7. The apparatus of claim 5, wherein each of the activation unit, the first delay unit, the second delay unit, and the output unit is a flip flop.

8. The apparatus of claim 1, wherein the counter is a two bit down counter.

9. The apparatus of claim 1, wherein the sleep signal is to indicate that a receiver is to enter a sleep mode.

10. The apparatus of claim 1, further comprising a conversion unit to generate the signal based on at least two differential input signals, wherein the signal is a single-ended signal.

11. The apparatus of claim 10, wherein the conversion unit is also to generate the input clock signal based on the at least two differential input signals.

12. The apparatus of claim 10, wherein the at least two differential input signals are Pulse Width Modulated (PWM) signals.

13. The apparatus of claim 12, wherein the PWM signals are to conform to the Mobile Industry Processor Interface (MIPI) M-PHY Specification.

14. A system comprising:
 a system on a chip comprising at least one core having at least one execution unit and receiver logic, the receiver logic comprising:
  a falling edge detector to detect a falling edge in a signal;
  a rising edge detector to detect a rising edge in the signal;
  a counter to perform a count to a first value in response to the falling edge detector detecting the falling edge in the signal;
  a delay unit to delay a start of the count after the falling edge detector detects the falling edge;
  an output unit to generate a sleep signal after the count when the rising edge detector does not detect the rising edge in the signal; and
 a wireless device coupled to the system on the chip via an interconnect, the interconnect used to communicate data between the wireless device and the receiver logic of the system on the chip.

15. The system of claim 14, the counter to perform the count downward using a two bit down counter and based on an input clock signal.

16. The system of claim 14, wherein the output unit is to terminate the sleep signal in response to the rising edge detector detecting the rising edge in the signal.

17. A method comprising:
 receiving, by a receiver of a first device, differential signals from a transmitter of a second device;
 generating, by the receiver, a generated clock signal using the differential signals;
 converting, by the receiver, the differential signals into a single-ended signal;

detecting, by a falling edge detector of the receiver, a falling edge in the single-ended signal;

in response to detecting the falling edge in the single-ended signal, delaying a start of a count for a delay period;

in response to completing the delay period, initiating the count based on the generated clock signal; and in response to completing the count, generating a sleep signal until detecting a rising edge in the signal.

18. The method of claim 17, further comprising performing the count downward using a two bit down counter.

19. The method of claim 17, wherein delaying the start of the count is performed using a plurality of flip flops.

20. The method of claim 19, wherein reset inputs of the plurality of flip flops are coupled to an output of a rising edge detector.

* * * * *